United States Patent
Riek et al.

[11] Patent Number: 5,774,183
[45] Date of Patent: Jun. 30, 1998

[54] METHOD FOR SIMULATING AN INCREASED SHUTTER TIME IN DIGITAL VIDEO

[75] Inventors: Jonathan K. Riek, Webster; Sergei Fogel, Rochester, both of N.Y.

[73] Assignee: Eastman Kodak Company, Rochester, N.Y.

[21] Appl. No.: 700,204

[22] Filed: Aug. 20, 1996

[51] Int. Cl.$^6$ .................................................. H04N 7/32
[52] U.S. Cl. ........................................ 348/416; 348/699
[58] Field of Search ................................ 348/96, 97, 384, 348/390, 402, 407, 413, 416, 699–702; 382/232, 236, 238; H04N 7/00, 7/137

[56] References Cited

U.S. PATENT DOCUMENTS

| | | | |
|---|---|---|---|
| 5,016,101 | 5/1991 | Richards et al. | 348/699 |
| 5,043,810 | 8/1991 | Vreeswijk et al. | 348/413 |
| 5,181,111 | 1/1993 | Hedley et al. | 348/701 |
| 5,241,372 | 8/1993 | Ohba | 348/700 |
| 5,241,608 | 8/1993 | Fogel | 348/416 |
| 5,343,241 | 8/1994 | Richards et al. | 348/97 |

OTHER PUBLICATIONS

Robert Thoma and Matthias Bierling, Motion Compensating Interpolation Considering Covered and Uncovered Background, Signal Processing: Image Communication 1 (Feb. 1989) pp. 191–212.

Philippe Robert, Motion Compensating Interpolation Considering Occluding, Appearing and Disappearing Areas, Signal Processing of HDTV, III (1992) pp. 329–341.

*Primary Examiner*—Richard Lee
*Attorney, Agent, or Firm*—Peyton C. Watkins

[57] ABSTRACT

A method for processing an input digital video signal, the method comprises the steps of capturing first and second frames from the input digital video signal; determining intermediate motion vectors from the first and second frames, which intermediate motion vectors represent motion of objects between frames; and re-creating the second frame for forming a blurred first frame having pixel values determined by combining pixels in the first and second frames, wherein the combining is controlled by the intermediate motion vectors.

6 Claims, 3 Drawing Sheets

METHOD FOR SIMULATING AN INCREASED SHUTTER TIME IN DIGITAL VIDEO

FIELD OF THE INVENTION

The invention relates generally to the field of digital video signal processing and, more particularly, to simulating an increased shutter time in frames produced by the digital video signal.

BACKGROUND OF THE INVENTION

Images recorded on film or video by cameras have a characteristic degree of motion blur associated with them due to camera integration effects, for example caused by the finite-open period of a shuttered camera. Due to the different speeds of subjects which the camera is capturing, a single shutter speed does not adequately create the desired blurring of all subjects in the frames. In this case, blurring techniques are used for further blurring the portion of the film which is inadequately blurred.

One such blurring technique is disclosed in U.S. Pat. No. 5,343,241. In this technique, a frame is chosen for blurring and a plurality of intermediate frames are created by motion-compensated temporal interpolation between the frame to be blurred and the frame immediately before it in time, and between the frame to be blurred and the frame immediately after it in time. The blurred frame is then produced by combining the frame chosen for blurring as originally produced and at least one of the intermediate frames.

Although the presently known and utilized method is satisfactory, it is not without drawbacks. Creating such intermediate frames is time consuming and requires extensive computer memory for storage.

Consequently, a need exists for an improved method for creating blurred frames for overcoming the above-described drawbacks.

SUMMARY OF THE INVENTION

The present invention is directed to overcoming one or more of the problems set forth above. Briefly summarized, according to one aspect of the present invention, the invention resides in a method for processing an input digital video signal, the method comprising the steps of: (a) capturing first and second frames from the input digital video signal; (b) determining intermediate motion vectors from the first and second frames, which intermediate motion vectors represent motion of objects between frames; and (c) re-creating the first frame for forming a blurred first frame having pixel values determined by combining pixels in the first and second frames, wherein the combining is controlled by the intermediate motion vectors.

It is an object of the present invention to provide a method for creating blurred frames which overcomes the above-described drawbacks.

It is an advantage of the present invention to produce such blurred framed by a cost efficient method.

It is a feature of the present invention to determine motion vectors from a pair of frames, which motion vectors represent motion of objects between frames.

The above and other objects of the present invention will become more apparent when taken in conjunction with the following description and drawings wherein identical reference numerals have been used, where possible, to designate identical elements that are common to the figures.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
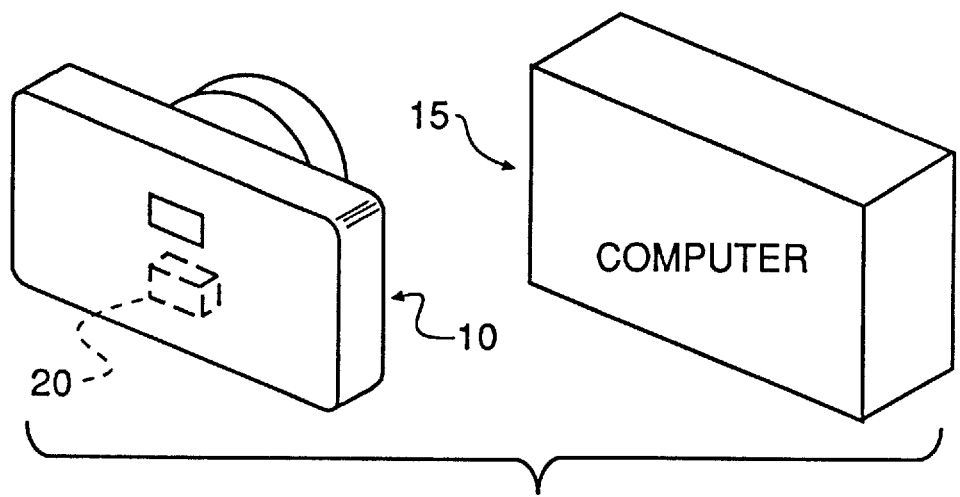
FIG. 1 is a perspective of a typical digital video camera for implementing the present invention.

Referring to FIG. 1, there is illustrated a digital video camera 10 typically having an shutter 20 which opens and closes for permitting light to expose film (not shown) resting therein for capturing a plurality of digital frames thereon. The shutter 20 is set to a predefined exposure time by the user for controlling the time that the light exposes the film, as is well known in the art.

Moving objects are occasionally captured so that its actual motion is simulated on the film, generally referred to in the art as blurring. For creating this effect, the exposure time is typically increased. However, the image as originally captured is sometimes captured with an insufficient exposure time to create the desired blurring during replay. To simulate the desired blurring, an increased exposure time may be simulated by the below-described method and apparatus which are implemented by software on a computer 15. It is instructive to note that a digital representation of the captured frames are received by the computer 15 and, consequently, the software by means well known in the art for further manipulation of the frames by the software.

Figure 2:
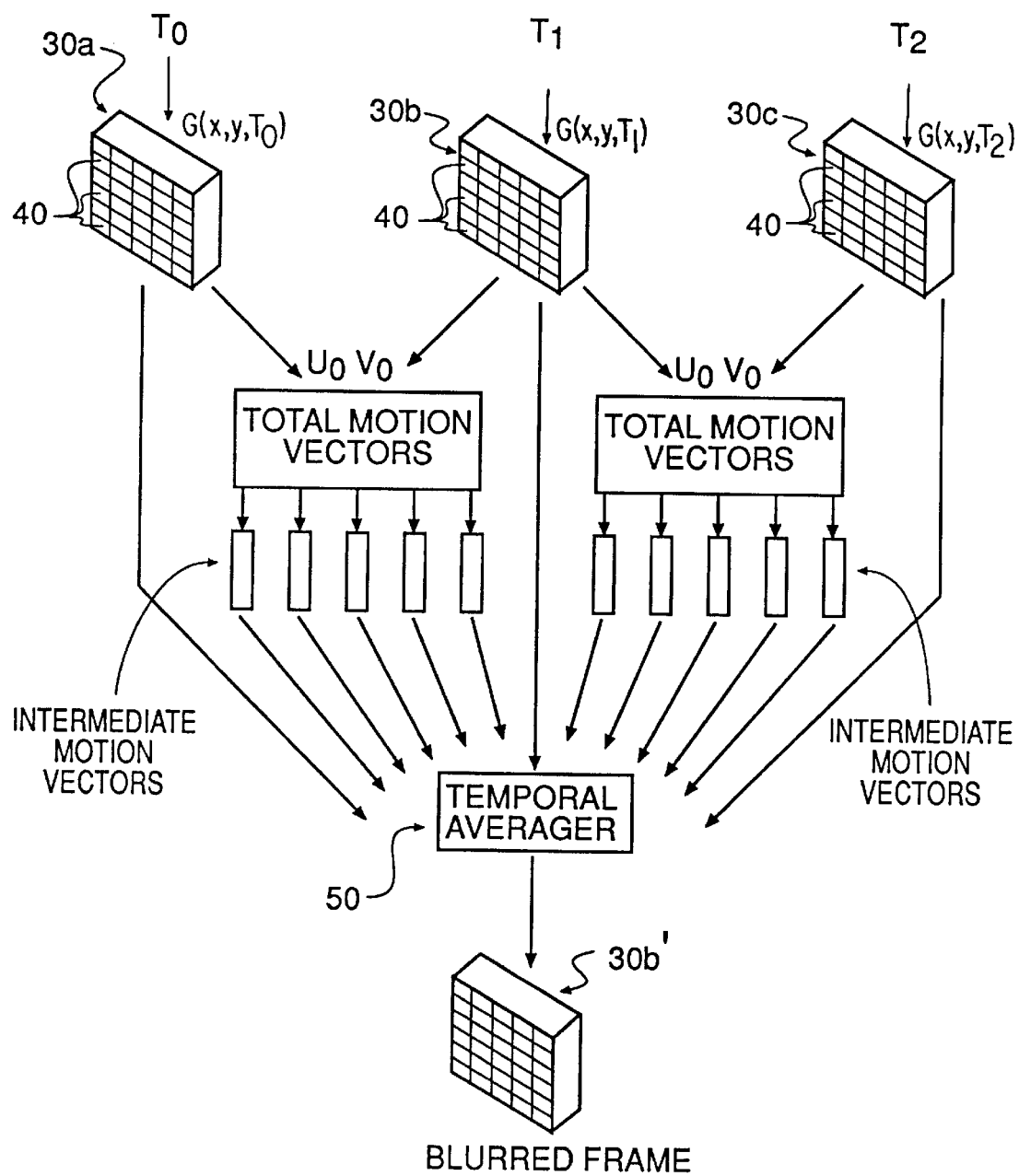
FIG. 2 is a schematic diagram of the present invention.

Referring to FIG. 2, the captured frames 30 received by the software are placed in chronological order ($T_0$, $T_1$, $T_2$, and etc.). The captured frames 30 are designated by G(x, y, $T_k$), where x and y are the spatial coordinates of the pixels and $T_k$ is the temporal location of the kth frame. For example, frame 30b is designated as G(x, y, $T_1$). It facilitates understanding to reiterate that each frame 30 has been captured with a predefined exposure time $\Delta T$, for example 20 milliseconds. Each frame 30 also includes a plurality of pixels 40 having a value, typically between 0 and 255, for defining each portion of the frame 30. A plurality of total motion vectors are calculated using any two frames 30, preferably adjacent frames, for defining the motion of objects from one frame to the next frame. Such motion vectors are disclosed in detail in U.S. Pat. No. 5,241,608.

The user then selects an exposure time to which the desired frame is to be increased (preferably an integer multiple of $\Delta T$) for simulating blurring, for example frame 30b which is hereinafter referred to as the blurred frame.

Figure 3:
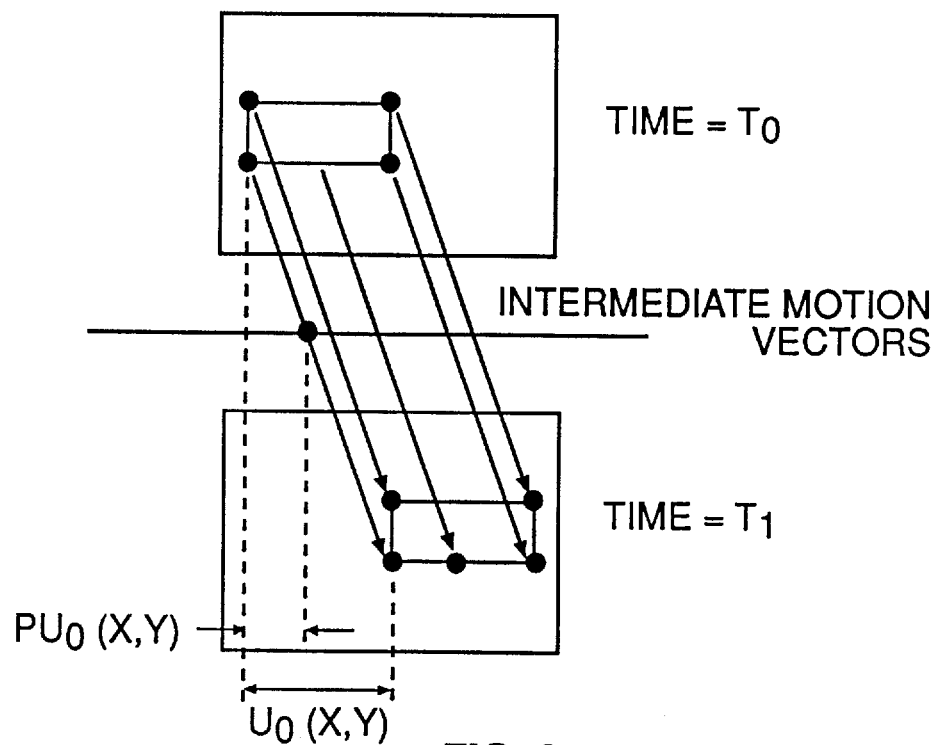
FIG. 3 is a diagram illustrating the method of the present invention for interpolating motion vectors.

The calculated total motion vectors are then transformed by the following equations for creating a plurality (N) of intermediate motion vector fields each of which comprises a plurality of motion vectors, which calculation is illustratively shown in FIG. 3. A method for deriving intermediate motion vectors is disclosed in "Motion Compensating Interpolation Considering Covered And Uncovered Background" *Image Communication* 1, 1989.

$$U_n[X+P(U_0(X,Y)), Y+P(V_0(X,Y))] = U_0(X,Y) \qquad \text{EQ. 1}$$

$$V_n[X+P(U_0(X,Y)), Y+P(V_0(X,Y))] = V_0(X,Y) \qquad \text{EQ. 2}$$

where:

$U_0$ is the x directional component of the total motion vector between two frames;

$V_O$ is the y directional component of the total motion vector between two frames;

$U_n$ is x directional component of the interpolated motion vector at each (n) subsequent $\delta T$;

$V_n$ is y directional component of the interpolated motion vector at each (n) subsequent $\delta T$;

X is the x directional component of a particular pixel in the frame which is to have simulated increased exposure time;

Y is the y directional component of a particular pixel in the frame which is to have simulated increased exposure time; and P is the percent of distance of the total motion vector from which the interpolated motion vector is disposed from the frame to be simulated; defined by the following equation $P=|n|\delta T/(T_1-T_0)$; where $n\delta T$ is the amount by which the intermediate motion vectors are temporally disposed from the blurred frame, and where n is an integer between $-(N-1)/2$ and $(N-1)/2$. In the preferred embodiment, $\delta T$ is equal to $\Delta T$.

Referring back to FIG. 2, a plurality of such intermediate motion vectors are preferably created between the frame 30b to be blurred and the frame 30a immediately before it in time (i.e., a first set of motion vectors), and also between the frame 30b to be blurred and the frame 30c immediately after it in time (i.e., a second set of motion vectors).

Figure 4:
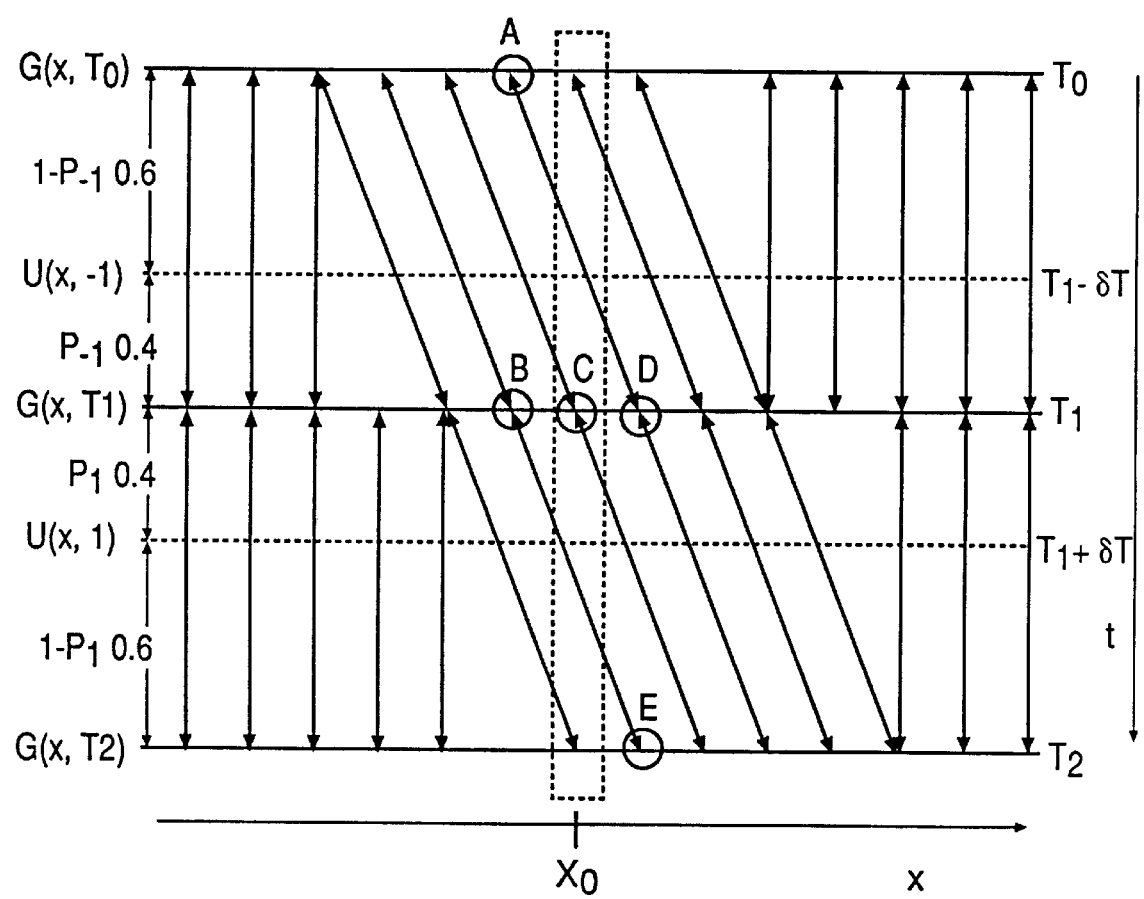
FIG. 4 is diagram illustrating the method of the present invention for creating the blurred frame.

The intermediate motion vectors and the data from the captured frames 30 are then applied to an averager 50 for creating the blurred frame 30b'. Referring briefly to FIG. 4, a one-dimensional illustration (only pixel locations along the x axis are shown) is shown for deriving each pixel value in the blurred frame 30b'. The blurred pixel at spatial location $X_0$ in the blurred image 30b' is obtained from the images at temporal locations $T_0$, $T_1$, and $T_2$, and from the intermediate motion vectors $U(X_0, n)$; where n is the set of motion vectors at times $T_1+n\delta T$. In this example, only the intermediate motion vectors calculated immediately before and after the frame ($T_1-\delta T$ and $T_1+\delta T$ respectively) to be blurred are used, although any number of intermediate motion vectors may be used as will be recognized by those skilled in the art. For this example, let us assume that N is 3. In general, the blurred pixel at $X_0$ is given by $$\frac{1}{N}\left\{\sum_{n=-(N-1)/2}^{-1}(P_n)G(X_0-P_nU(X_0,n),T_0)+(1-P_n)G(X_0+\right.$$

$$(1-P_n)U(X_0,n),T_1)+G(X_0,T_1)+\sum_{n=1}^{(N-1)/2}(1-P_n)G(X_0-$$

$$\left.P_nU(X_0,n),T_1+P_nG(X_0+(1-P_n)U(X_0,n),T_2)\right\}$$

where $P_n$ is the percent distance from the previous image, that is, $P_n=1+n\Delta T/(T_1-T_0)$ for $n<0$ and $P_n=n\Delta T/(T_2-T_1)$ for $n>0$ So, for our example, the blurred pixel at $X_0$ is $$\frac{1}{3}\{(0.4A+0.6D)+C+(0.6B+0.4E)\}$$

where A, B, C, D and E represent pixel values in the frames 30.

The equation extends fairly straightforwardly to two dimensions. The blurred pixel at $(X_0, Y_0)$ is $$\frac{1}{n}\left\{\sum_{n=-(N-1)/2}^{-1}(P_n)G(X_0-P_nU(X_0,Y_0,n),Y_0-\right.$$

$$P_nV(X_0,Y_0,n),T_0)+(1-P_n)G(X_0+(1-P_n)U(X_0,Y_0,n),Y_0+$$

$$(1-P_n)V(X_0,Y_0,n),T_1)+G(X_0,Y_0,T_1)+$$

$$\sum_{n=1}^{(N-1)/2}(1-P_n)G(X_0-P_nU(X_0,Y_0,n),Y_0-$$

$$P_nV(X_0,Y_0,n),T_1)+P_nG(X_0+(1-P_n)U(X_0,Y_0,n),Y0+$$

$$\left.(1-P_n)V(X_0,Y_0,n),T_2)\right\}$$

The invention has been described with reference to a preferred embodiment. However, it will be appreciated that variations and modifications can be effected by a person of ordinary skill in the art without departing from the scope of the invention.

| Parts List: | |
|---|---|
| 10 | digital video camera |
| 15 | computer |
| 20 | shutter |
| 30 | frames |
| 40 | plurality of pixels |
| 50 | temporal averager |

We claim:

1. A method for processing an input digital video signal, the method comprising the steps of:

(a) capturing first and second frames from the input digital video signal;

(b) determining a first set of intermediate motion vectors from the first and second frames, which said first set of intermediate motion vectors represent motion of objects between frames; and (c) forming a blurred first frame having pixel values determined by combining pixel values in the first and second frames without creating an intermediate frame from the first set of intermediate motion vectors, wherein the combining is controlled by the first set of intermediate motion vectors.

2. The method as in claim 1 wherein step (c) of combining pixel values in the first and second frames includes wherein the pixel values to be combined are determined by pixel locations in the first and second frames to which the first set of intermediate motion vectors project.

3. The method as in claim 2 further comprising determining a plurality of first set of intermediate motion vectors from the first and second frames.

4. The method as in claim 1 further comprising capturing a third frame from the input digital video signal and determining a second set of intermediate motion vectors from the second and third frames.

5. The method as in claim 4 further comprising combining pixel values in the second and third frames, wherein the pixel values to be combined are determined by pixel locations in the second and third frames to which the second set of intermediate motion vectors project.

6. The method as in claim 5 further comprising determining a plurality of second set of intermediate motion vectors.

* * * * *